Figure 1:
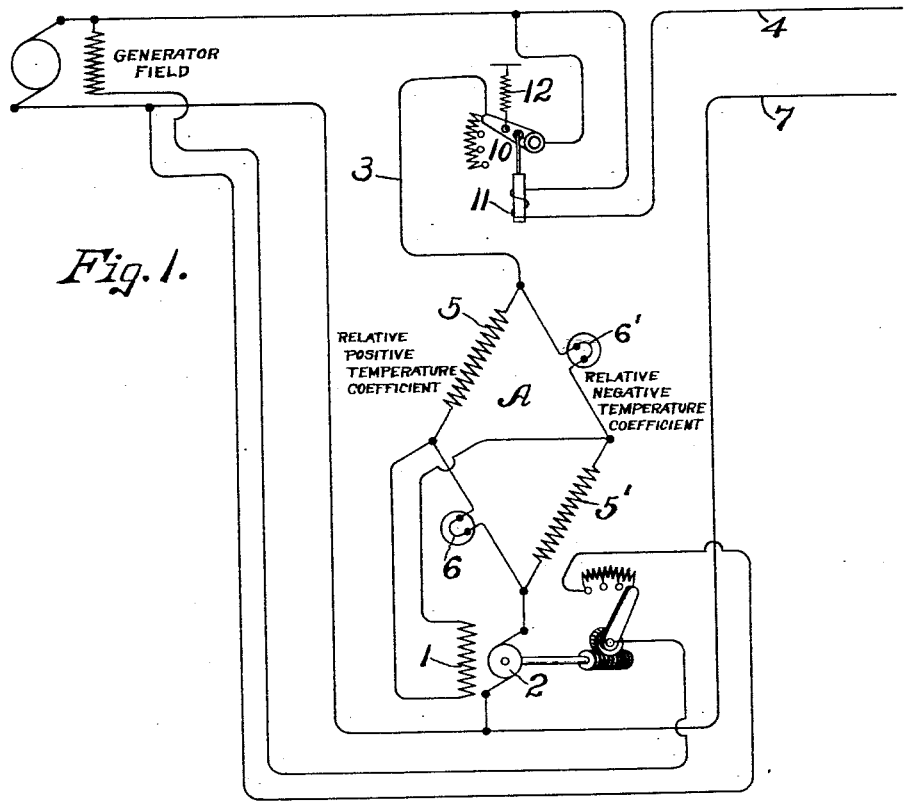

No. 854,121. PATENTED MAY 21, 1907.
S. B. STORER.
SYSTEM OF ELECTRICAL DISTRIBUTION.
APPLICATION FILED AUG. 10, 1905.

Witnesses.
A. C. Thomas
W. E. Chase

Inventor.
S. B. Storer
By.
Howard P. Denison
Attorney.

UNITED STATES PATENT OFFICE

SIMON B. STORER, OF SYRACUSE, NEW YORK.

SYSTEM OF ELECTRICAL DISTRIBUTION.

No. 854,121.  Specification of Letters Patent.  Patented May 21, 1907.

Application filed August 10, 1905. Serial No. 273,641.

*To all whom it may concern:*

Be it known that I, SIMON B. STORER, of Syracuse, in the county of Onondaga, in the State of New York, have invented new and useful Improvements in Systems of Electrical Distribution, of which the following, taken in connection with the accompanying drawings, is a full, clear, and exact description.

This invention relates to improvements in electric current regulators for maintaining approximately a definite or predetermined voltage or intensity of the current at any point or points in a system of electrical distribution, such, for instance, as a lighting or power circuit. Aside from hand-regulation, or what may be termed "manual control", this predetermined voltage or intensity of the current may be maintained through the medium of an electric motor, or its equivalent, and suitable electro-mechanical devices which are brought into action by fluctuations of the current, or voltage to be regulated, to govern the action of the motor, the latter serving to operate a variable electrical resistance device in connection with dynamos for the purpose of introducing into the circuit more or less resistance as the current fluctuates above or below the normal or predetermined voltage or intensity, or such motor may be employed to operate any other form of voltage or current regulating device, or devices.

In some instances, the means for controlling the action of the motor is purely mechanical, and in other instances, a combined electrical and mechanical means is employed, but the broad object of my invention is to govern this action of the motor wholly and solely by electrical means, consisting in this instance, of a specially designed "Wheatstone bridge", which is connected in series with one of the two essential parts of the motor, while the other part of said motor is connected across the normally neutral points of the bridge. This object, more specifically stated, is to construct a Wheatstone bridge with resistances having certain individual and relative electrical characteristics whereby an electrical balance is established under normal conditions of the current or voltage, but under the fluctuations of such conditions above or below normal, these characteristics are such as to cause the current to flow in one direction or the other through the part of the motor, as the field or armature, which may be connected across the bridge to the normally neutral points of said bridge, the relative direction of flow depending upon the thermal conditions of the resistances which are located in the four sides of the bridge, as hereinafter more fully described.

Another object is to provide means to compensate for changeable line-loss due to load fluctuations in the main circuit and to keep the voltage of this circuit constant at the receiving, rather than at the generating end of such circuit.

Figure 2:
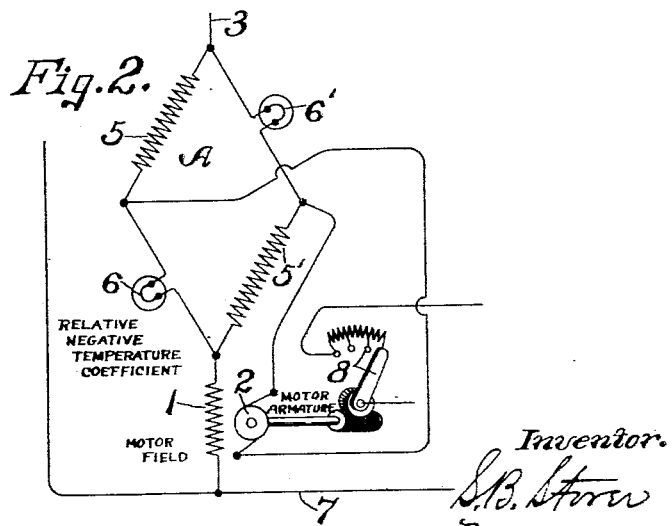

Figure 1 is a diagrammatic view of a system of electrical distribution showing the application of my invention thereto and in which the motor field forms a part of the cross connection of the bridge. Fig. 2 is a diagrammatic view of the Wheatstone bridge seen in Fig. 1 except that the motor armature is connected across the bridge.

In order to clearly demonstrate the practicability and operativeness of my invention, I have shown in the drawings—a diagrammatic view of a portion of the main circuit and my improved appliances connected therein for carrying out the objects stated, and in which one of the parts, as the field —1—, of an electric motor is utilized as the cross connection of a Wheatstone bridge —A— while the other part of said motor, as the armature —2—, is connected in series with the Wheatstone bridge, which in turn, is connected by a wire —3— to receive current from an electric circuit —4— and —7—, the voltage of which is to be regulated.

The sides of the bridge leading to one side of the motor-field —1—, are provided with electrical resistances —5 and —6— of different electrical characteristics, while the other sides of the bridge leading to the opposite side of the field —1— are provided with resistances —5′— and —6′—, which also differ in their electrical characteristics, but are similar to the resistances —5— and —6— respectively so that two unlike resistances are connected in series in the sides of the bridge, but in reverse order, as shown. The function of these resistance parts is dependent upon their relative thermal-conditions, the resistances —5— and 5′—, which are preferably of iron, having a positive temperature co-efficient relative to the parts —6— and 6′—, and it, therefore, follows that the relative temperature co-efficient of the parts —6— and 6′—, which are preferably of carbon, is negative. In other words, the electrical resistance in each of the parts 5— and 5'— varies directly with the rise and fall of the temperature of such parts, while the electrical resistance of each of the parts —6— and 6'— varies inversely with the rise and fall of temperature therein so that any increase, or decrease of temperature in the parts —5— or 5'—, respectively, correspondingly increases or diminishes the resistance therein, but the increase or decrease in the temperature of the parts —6— and 6'—, respectively, correspondingly diminishes or increases the resistance in said parts. It is obvious that the temperature of these resistance parts is controlled by the degree of voltage in the circuit from which they receive current and that at a certain degree of voltage in the parts —5— and —6—, and —5'— and 6'— the resistances in the bridge become equal or balanced and no current will flow through the motor-field —1—. These resistances —5— and —6— and 5'— and 6'— are, therefore, selected and adjusted so as to be substantially balanced at such voltage as it may be desirable to maintain in the circuit —4— and —7—. Now, assuming, that this normal voltage and an electric balance is established, then any increase in the voltage of the current passing into the bridge will cause a rise of temperature in all of the resistance parts —5— and —5'— and —6— and —6'—, thereby increasing the resistance in the parts —5— and —5'— and diminishing the resistance in the parts —6— and 6'—. Under such conditions, it is evident that more current will flow through the resistances —6— and 6'— than through the parts —5— and —5'— and that the difference between the two values of current will flow through the motor-field —1—, it being understood that the armature —2— of the motor is connected in series with the bridge. This causes the armature to be rotated in one direction to operate a variable resistance device or current or voltage regulator —8—, which is connected to and actuated by the motor to cut in or out more or less resistance or steps in a voltage regulator until the normal voltage is restored in the main circuit. On the other hand, should the voltage in the circuit —4— and —7— fall below normal then the temperature in all the resistance parts —5— and —5'— and 6— and 6'— would also fall, thereby lowering the electrical resistance in the parts —5— and —5'— and at the same time increasing the resistance in the parts —6— and 6'— so that the larger current would then flow in the parts —5— and —5'—, while the difference would flow through the motor-field —1—, but in a direction opposite to that previously taken, thus reversing the action of the motor and the variable resistance device or voltage regulator controlled by said motor to again restore the current to normal voltage. These operations are repeated automatically as often as the current in the main circuit fluctuates above or below a normal, or predetermined voltage, and owing to the sensitiveness and delicacy of operation of a bridge of this character, it is evident that the current will be held very closely to the normal or predetermined voltage with but slight fluctuations.

In connection with the device just described, it may be desirable to maintain a constant voltage in the circuit at some distance from the dynamo, or other generator, or wherever the regulator is placed, and I, therefore electrically connect a variable resistance device, as a rheostat —10— in series with and between the bridge and the main feed-wire, and also electrically connect the winding of a solenoid in the main circuit with its movable plunger mechanically connected to the movable member of the rheostat so that any current in the main circuit energizes the solenoid and operates the rheostat to cut in more or less resistance —10— in the circuit through the bridge so that the drop in voltage through the resistance —10— would be the same, or practically the same as the drop in the main circuit to the point at which the constant voltage is to be maintained. The action of the plunger of the solenoid —11— is opposed by suitable means, as a spring —12— which serves to return the rheostat-contact-arm to its "off" or "out" position when there is no current flowing in the main circuit —4— and —7—.

It will be seen that the two parts of the motor may be interchanged or substituted, one for the other, without affecting the action of the device. That is, the motor armature may be placed across the bridge instead of the motor field —1— in which case the motor-field would be connected in series with the bridge.

The operation of my improved electric current-regulator is fully set forth in the foregoing descriptive matter, and while I am aware that various manual and mechanical means have been employed to maintain a definite or predetermined voltage in an electric circuit, I believe that I am the first to employ purely electrical means for this purpose, and particularly in the use of one of the motor parts, as a connection across the neutral points of a Wheatstone bridge, whereby the rise or fall of the current in the main circuit above or below a predetermined voltage causes the motor to rotate in opposite directions for the purpose of varying the resistance or voltage which is to be introduced into the main circuit.

What I claim:

1. An electric current regulator including resistances having different temperature coefficients in which an electrical balance is established under a predetermined voltage or current intensity, and means brought into action by fluctuations above or below such predetermined voltage or current intensity to restore such balance.

2. An electric current regulator comprising resistances having different temperature co-efficients in which an electrical balance is established under a predetermined voltage, an electrically operated device brought into action by fluctuations above or below such predetermined voltage, and means actuated by said device to restore such balance.

3. An electric current regulator comprising an electrical balance including therein resistances having different temperature co-efficients, an electric motor actuated in reverse directions by fluctuations above or below a predetermined voltage or current value by which the balance is established, and means actuated by the motor to restore such balance.

4. An electric current regulator comprising an electrical balance including therein resistances having different temperature co-efficients in which the balance is destroyed by fluctuations above or below a predetermined voltage or current intensity, an electric motor actuated in reverse directions by such fluctuations, and means actuated by the motor to introduce more or less resistance to restore such balance.

5. An electric circuit and an electric balance deriving current therefrom and held in balance under a predetermined voltage or current intensity, said balance including resistances having different temperature co-efficients an electric motor actuated in reverse directions by fluctuations above or below such predetermined voltage or current intensity, and means actuated by the motor for introducing more or less resistance to restore such balance.

6. An electric current regulator including therein a Wheatstone bridge including resistances having different temperature co-efficients and electrically balanced under a predetermined voltage or current, and means brought into action by fluctuations above and below such predetermined voltage or current to keep the bridge approximately in balance said motor having one of its windings in series with the bridge.

7. An electric circuit including therein a Wheatstone bridge including resistances having different temperature co-efficients and balanced under a predetermined current or voltage, and means brought into action by fluctuations above or below such predetermined voltage or current for actuating the regulator.

8. An electric circuit including therein a Wheatstone bridge including resistances having different temperature co-efficients and balanced under a predetermined voltage or current intensity, an electric motor actuated by fluctuations above or below such predetermined voltage or current intensity, and means actuated by the motor to introduce more or less voltage in the circuit whereby the balance of the bridge is restored.

9. In a system of electrical distribution, means for approximately maintaining a predetermined voltage or current intensity in such system including a Wheatstone bridge having in its branches resistances of different temperature co-efficients and an electric motor having one of its elements forming the cross connection of the bridge.

10. In a system of electrical distribution, means for approximately maintaining a predetermined voltage or current intensity in such system including a Wheatstone bridge having in its branches resistances of different temperature co-efficients and an electric motor having one of its elements forming the cross connection of the bridge, and its other element connected in series therewith.

11. In a system of electrical distribution, means for approximately maintaining a predetermined voltage or current intensity in such system including a Wheatstone bridge and an electric motor having one of its elements forming the cross connection of the bridge, and its other element connected in series therewith, and means actuated by the motor for introducing more or less resistance whereby the electrical balance of the bridge is restored.

12. In a system of electrical distribution, a current regulator comprising a Wheatstone bridge deriving current from the system and balanced under a predetermined voltage or current intensity, an electric motor having one of its elements connecting the normally neutral points of the bridge and its other element in series therewith, and means actuated by the motor to keep the current or voltage approximately constant in the system.

13. In a system of electrical distribution, a Wheatstone bridge deriving current from said system, and including in its branches resistances of different temperature co-efficients and an electric motor having one of its elements forming the cross connection of the bridge.

14. In a system of electrical distribution, resistances of different temperature co-efficients deriving current from said system and balanced under a predetermined current intensity or voltage, and means brought into action by the unbalancing of the resistances for maintaining approximately a constant voltage or current in the system.

15. In a system of electrical distribution, a Wheatstone bridge deriving current from said system and balanced under a predetermined voltage or current, said bridge including in its branches resistances having different temperature co-efficients an electric motor having one of its elements forming the cross connection of the bridge, whereby the motor is actuated in reverse directions as the current flows in reverse directions relative to the other element of the motor through said cross connection due to fluctuations above or below the predetermined voltage or current in the bridge.

16. In a system of electrical distribution, a Wheatstone bridge having unlike resistances receiving current from said system and balanced under a predetermined voltage or current, the unlike resistances having different temperature co-efficients, an electric motor having one of its parts forming the cross connection of the bridge and its other part in series with the bridge whereby the motor is actuated by the flow of current through such connection, and means actuated by the motor to maintain approximately a constant voltage or current in the system.

17. In a system of electrical distribution, a Wheatstone bridge deriving current from the system and having normally balanced electrical resistances which vary in degree at the same temperature as effected by the rise and fall of the voltage or current, a motor having one of its windings forming the cross connection of the bridge, whereby the motor is actuated when the resistances are unbalanced and means actuated by the motor to regulate the current or voltage in the system.

18. An electric current or voltage regulator including therein a Wheatstone bridge having in each branch resistances of different electrical characteristics, the resistance in one of said branches varying directly and that of the other inversely with its thermal changes.

19. An electric current regulator including therein two connected branch conductors deriving current from the same source, the resistance of one varying directly and that of the other inversely with its change of temperature, and a motor winding forming a cross connection between said branches.

20. An electric regulating device comprising two branch conductors connected at their ends and deriving current from the same source and each having two unlike resistances normally in electrical balance with those of the other branch, one resistance of each branch varying directly and the other inversely as its temperature changes, a motor winding forming a cross connection between said branches, and a rheostat current regulator actuated by the motor.

In witness whereof I have hereunto set my hand this 31st day of July 1905.

SIMON B. STORER.

Witnesses:
H. E. CHASE,
M. M. NOTT.